(12) United States Patent
Deivasigamani et al.

(10) Patent No.: US 10,018,366 B2
(45) Date of Patent: Jul. 10, 2018

(54) LEARNING-BASED RECIRCULATION AND TEMPERATURE SETPOINT CONTROL SYSTEM

(71) Applicants: Sridhar Deivasigamani, Peoria, IL (US); Sivaprasad Akasam, Dunlap, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 322 days.

(21) Appl. No.: 15/016,987

(22) Filed: Feb. 5, 2016

(65) Prior Publication Data

US 2016/0231006 A1 Aug. 11, 2016

Related U.S. Application Data

(60) Provisional application No. 62/112,451, filed on Feb. 5, 2015.

(51) Int. Cl.
| | |
|---|---|
| *F24D 19/00* | (2006.01) |
| *F24D 3/02* | (2006.01) |
| *F24D 19/10* | (2006.01) |
| *G05D 7/06* | (2006.01) |
| *F22D 7/00* | (2006.01) |
| *F24H 9/20* | (2006.01) |

(52) U.S. Cl.
CPC ........... *F24D 19/1012* (2013.01); *F24D 3/02* (2013.01); *F24D 19/1048* (2013.01); *F24D 19/1069* (2013.01); *F24D 19/1081* (2013.01); *Y02B 30/745* (2013.01)

(58) Field of Classification Search
CPC ............. F24D 19/1012; F24D 19/1048; F24D 19/1069; F24D 19/1081; F24D 3/02; F24D 2200/043; Y02B 30/745; G05D 7/0682; G05D 7/0688; G05D 23/1904; G05D 7/06; G05D 23/19; F23N 1/087; F22D 7/00; F24H 9/2007
USPC ........... 237/8 R, 8 A, 13, 81; 236/25 R; 122/14.22, 14.2, 14.3, 448.3, 406.1, 122/406.5, 448.1
IPC ............... F24D 19/10,3/02; G05D 7/06, 23/19; F22D 7/00; F24H 9/20
See application file for complete search history.

(56) References Cited

U.S. PATENT DOCUMENTS

| | | | | |
|---|---|---|---|---|
| 4,206,874 | A | * | 6/1980 | Semple ..................... F24D 3/08 237/63 |
| 4,323,192 | A | * | 4/1982 | Jackson ............... F24D 19/1015 236/46 R |

(Continued)

FOREIGN PATENT DOCUMENTS

| | | | |
|---|---|---|---|
| JP | 63210535 | A * | 9/1988 |
| JP | 01208659 | A * | 8/1989 |

(Continued)

*Primary Examiner* — Gregory Huson
*Assistant Examiner* — Daniel E Namay
(74) *Attorney, Agent, or Firm* — Tracy Jong Law Firm; Tracy P. Jong; Cheng Ning Jong

(57) ABSTRACT

A method for saving energy by shutting down unnecessary equipment in a water heating system and setting back temperature setpoints to reduce energy losses. The present method is aimed at reducing energy wastage due to unnecessary external recirculation and overly high temperature setpoint for the external recirculation flow when no demands exist for an extended period of time.

18 Claims, 7 Drawing Sheets

(56) References Cited

U.S. PATENT DOCUMENTS

| | | | | |
|---|---|---|---|---|
| 4,921,163 | A * | 5/1990 | Viessmann | F24D 19/1009 236/46 R |
| 5,190,215 | A * | 3/1993 | Habermehl, Jr. | G05D 23/1931 165/291 |
| 7,819,334 | B2 * | 10/2010 | Pouchak | F23N 5/00 122/448.1 |
| 8,467,910 | B1 * | 6/2013 | Kumar | G05D 23/1931 700/291 |
| 8,490,886 | B2 * | 7/2013 | Cohen | F24D 19/1009 122/4 R |
| 8,636,226 | B2 * | 1/2014 | Paulus | F24D 19/1048 122/16.1 |
| 8,844,834 | B1 * | 9/2014 | Lyons | G05D 23/1919 236/14 |
| 8,978,748 | B2 * | 3/2015 | Perrin | F24D 19/1012 165/292 |
| 9,175,864 | B2 * | 11/2015 | Yun | F24D 3/02 |
| 9,317,026 | B2 * | 4/2016 | Shiel | G05B 15/02 |
| 2008/0154546 | A1 * | 6/2008 | Kato | F23N 5/203 702/187 |
| 2010/0012740 | A1 * | 1/2010 | Paulus | F24D 19/1048 237/12.1 |
| 2011/0031323 | A1 * | 2/2011 | Nold | G05B 19/0428 236/20 R |
| 2012/0227953 | A1 * | 9/2012 | Yun | F24D 3/02 165/200 |
| 2013/0000732 | A1 * | 1/2013 | Flashaar | F24D 19/1012 137/1 |
| 2013/0098596 | A1 * | 4/2013 | Fisher | F24F 11/0034 165/237 |
| 2014/0222218 | A1 * | 8/2014 | D'silva | G01K 17/10 700/276 |
| 2015/0040841 | A1 * | 2/2015 | Leman | F24F 5/0096 122/14.3 |
| 2015/0204577 | A1 * | 7/2015 | Son | F24D 19/1066 122/14.1 |
| 2016/0047558 | A1 * | 2/2016 | Shimada | F24D 19/1069 237/8 A |

FOREIGN PATENT DOCUMENTS

| | | | | |
|---|---|---|---|---|
| JP | 01208660 | A * | 8/1989 | |
| JP | 03036404 | A * | 2/1991 | |
| JP | 2012189308 | A * | 10/2012 | F24D 3/02 |
| JP | 2015224796 | A * | 12/2015 | F24H 4/04 |

\* cited by examiner

LEARNING-BASED RECIRCULATION AND TEMPERATURE SETPOINT CONTROL SYSTEM

PRIORITY CLAIM AND RELATED APPLICATIONS

This non-provisional application claims the benefit of priority from provisional application U.S. Ser. No. 62/112,451 filed Feb. 5, 2015. Said application is incorporated by reference in its entirety.

BACKGROUND OF THE INVENTION

1. The Field of the Invention

The present invention is directed generally to a method for controlling external recirculation and water heater temperature setpoint. More specifically, the present invention is directed to a method for controlling external recirculation and temperature setpoint of a water heater.

2. Background Art

In a water heating system serving a large number of customers in a building, e.g., hotel, apartment complex, restaurant, high rise, industrial complex, a single large water heating system or multiple units of functionally networked water heating systems are traditionally used to service the many hot water demands of occupants of the building. In delivering hot water to far reaches of a building, one or more centrally located water heaters are typically configured to deliver hot water via long stretches of insulated or non-insulated fluid conductors. Considerations are typically made to account for heat losses (to the fluid conductors and their surroundings) when delivering hot water over great distances, e.g., hot water prepared to a higher setpoint temperature is provided to account for temperature drop due to heat losses on its path to points of use. In one example, for a typical hot water delivery temperature of 120 degrees F., the setpoint temperature of the hot water heater is adjusted to 140 degrees F. such that the delivery temperature can be kept at about 120 degrees F. In most installations, points of use are not equipped with temperature sensors for temperature feedback. Therefore, such a system operates with an assumption that the delivery temperature is inadequate if the water heater temperature setpoint is not increased. It is therefore clear that significant energy inefficiencies can result from such a system when water delivery is requested. It is also customary to keep the hot water at or near points of use at suitable delivery temperature using an external recirculation circuit at all times to anticipate a hot water usage. Therefore, energy wastage occurs not only during periods of use of hot water but also when a usage is expected to occur or periods of no use. It may also be customary to equip a hot water delivery system with an external recirculation circuit which is aided with a dedicated pump. In conventional systems, this dedicated pump is turned on at all times with or without a hot water demand. If hot water has already been demanded, the external recirculation circuit already contains sufficient warm water and therefore should not require that the dedicated pump to still be run. Therefore, significant amounts of energy is lost by the practice of constantly pushing water through the external recirculation circuit regardless of whether a demand exists and that the delivery temperature be constantly maintained at a higher level in anticipation of temperature losses at points of delivery regardless of whether a demand exists.

Thus, there is a need for a method for determining the periods in which external recirculation are unnecessary and the periods in which the setpoint temperature of a water heating system can be lowered such that energy may be conserved during these periods by turning off the external recirculation and lowering the setpoint temperature of the water heaters.

SUMMARY OF THE INVENTION

In accordance with the present invention, there is provided a method for controlling external recirculation in a hot water system having a main heating circuit, an external recirculation circuit fluidly and operably connected to the main heating circuit, a flow meter configured for detecting a flowrate through the main heating circuit, a pump for effectuating circulation in the external recirculation circuit, a controller operably connected to the flow meter and the pump, the method including:

(a) determining at least one event from flowrate data of the flow meter collected over a time period of a plurality of days, the at least one event includes a time span of a day in which the flowrate remains below or at a threshold value over the time span of a day within each day of the plurality of days;

(b) determining overlaps of each event to another one of the events of all days within the time period; and (c) determining a frequency of the overlaps of each event over the time period and if the frequency exceeds a frequency threshold, executing a counteraction pair including a first action and a second action in opposition to the first action during a time span corresponding to each event, wherein the first action is executed at the start of the time span corresponding to each event and the second action is executed at the end of the time span corresponding to each event within a new time period.

In one embodiment, the counteraction pair includes lowering the temperature setpoint of the hot water system and raising the temperature setpoint of the hot water system.

In another embodiment, the counteraction pair includes lowering the speed of the pump to a value lower than its normal speed and raising the speed of the pump to its normal speed.

In one embodiment, the counteraction pair includes turning off the pump and turning on the pump.

In one embodiment, time spans outside of the event are determined and the pump is turned off during these time spans.

In one embodiment, the threshold value is a mean over sustained non-zero flowrate.

In another embodiment, the threshold value is about 20% over a mean of minimum sustained non-zero flowrate.

In one embodiment, the time period is about a week.

In one embodiment, the time span of a day is about 60 minutes.

In one embodiment, the overlap is about 30 minutes.

In one embodiment, the frequency threshold is about three.

An object of the present invention is to provide a method for saving energy by shutting off external recirculation when it is not required or when a hot water demand is already causing such recirculation.

Another object of the present invention is to provide a method for determining whether or not the temperature setpoint of a hot water system may be lowered over the course of a day to conserve energy based on learning a usage pattern.

Another object of the present invention is to provide a method for determining whether or not the external recirculation pump speed of a hot water system may be lowered over the course of a day to conserve energy based on learning a usage pattern.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered as limiting of its scope, the invention will be described and explained with additional specificity and detail through the use of the accompanying drawings in which:

FIG. 1 is a diagram depicting water heaters operably connected to an external recirculation circuit where no water heaters are turned on and the external recirculation circuit is not turned on.

PARTS LIST

2—water heater
4—expansion tank
6—external recirculation pump
8—points of use
10—external recirculation circuit
12—gas supply
14—cold water supply
16—internal recirculation pump
18—internal recirculation circuit
20—valve
22—period in which only external recirculation is active
24—flowrate spikes

PARTICULAR ADVANTAGES OF THE INVENTION

The present hot water system is capable of determining the periods in which external recirculation is unnecessary based on water heating operation data and turning off external recirculation pump during these periods to conserve energy.

The present hot water system is also capable of determining the periods in which hot water is typically not requested and lowering the temperature setpoint of the present hot water system to conserve energy.

DETAILED DESCRIPTION OF A PREFERRED EMBODIMENT

Figure 1:
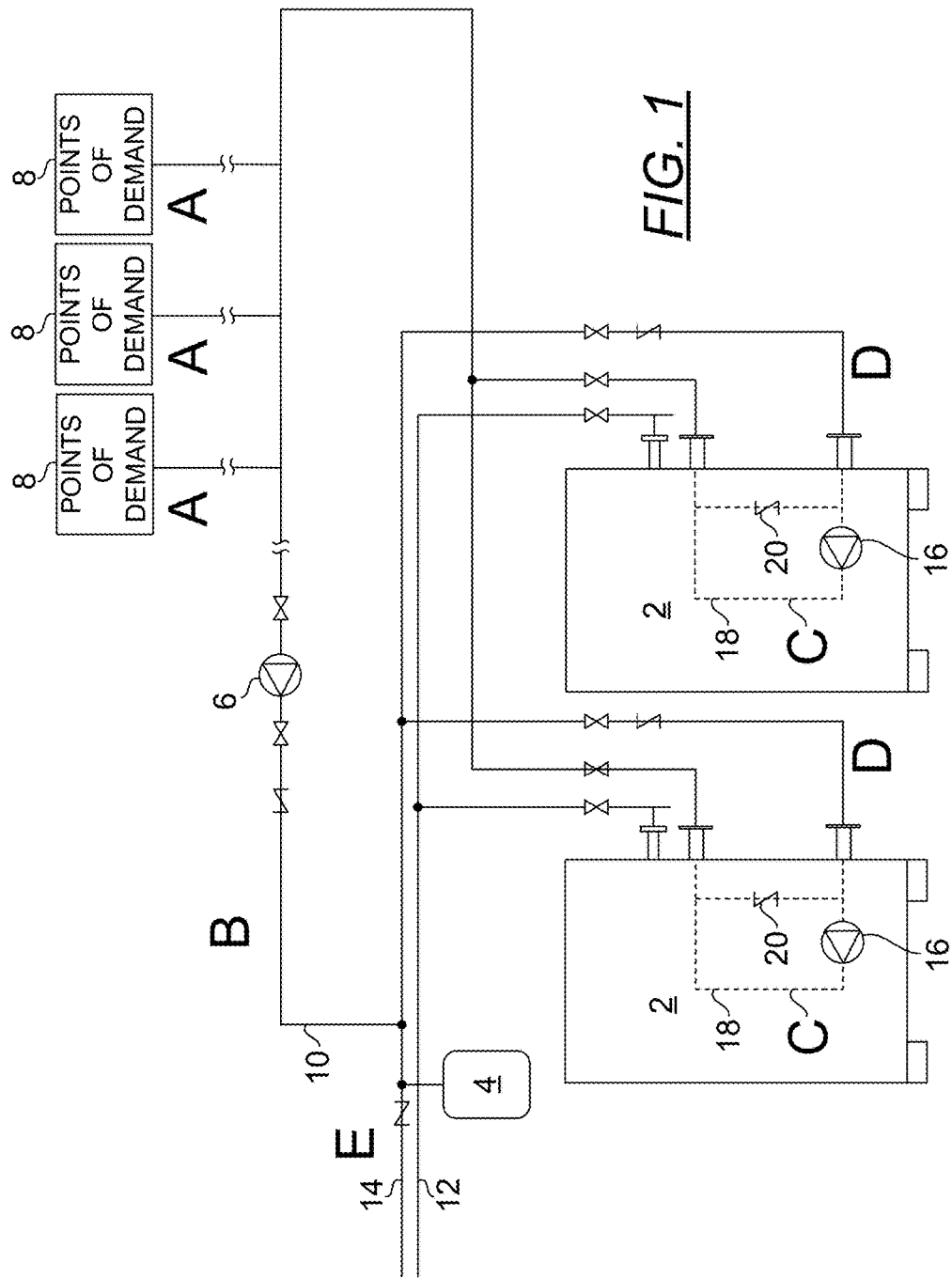

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower). Disclosed herein is a method for saving energy by shutting down unnecessary equipment in a water heating system and setting back or reducing temperature setpoints to reduce energy losses as heat transfer is a function of the temperature gradient between two objects or media where heat transfer occurs. The present method is aimed at reducing energy wastage due to unnecessary external recirculation and overly high temperature setpoint for the external recirculation flow when no demands exist for an extended period of time. Heat losses from a medium, e.g., water become more severe when the temperature of the medium is elevated as the temperature gradient of the heat source and its surroundings becomes greater. FIG. 1 is a diagram depicting water heaters 2 operably connected to an external recirculation circuit 10 where no water heaters 2 are turned on and the external recirculation circuit 10 is not turned on. Depicted herein are points of use 8, each connected to the external recirculation circuit 10. For simplicity, only two water heaters 2, three points of use 8 and one external recirculation circuit 10 are shown. In practice, there can be many more points of use and more water heaters connected in a manner similar to those depicted in FIG. 1. Each water heater 2 is fluidly connected to the external recirculation circuit 10. Each point of use 8 taps into the external recirculation circuit 10. If a demand starts at a point of use 8, a hot water supply is prepared at one or more water heaters 2 and supplied at the point of use 8 either under normal water pressure or with the aid of a pump 6 configured to return at least a portion of the flow fed through the external recirculation circuit 10. During periods of no demands, the external recirculation circuit helps ensure that the delay to receive hot water when a demand is suddenly requested at a point of use 8 is cut short typically from tens of seconds to seconds depending on the distance between the point of use 8 to the water heater 2. Typically in a hot water supply system, the points of use and the fluid conductors including the external recirculation pump 6 are within the realm of responsibility of the construction company or the management team of the building while the water heaters are installed by a separate entity before handing the management responsibility of these water heaters over to the management team. Each of the water heaters of the present control system includes a control output line adapted to provide a control input to a pump 6 configured to recirculate the external recirculation circuit. This control output line is capable of turning on or off a pump and modulating the speed of the pump. Controllers and other hardware suitable and adapted for basic control functions of the pumps, burners or other heating elements of the water heating system are well within those skilled in the art. In a conventional external recirculation circuit, a pump adapted for external recirculation is typically disposed in the on state at all times, regardless of whether an external recirculation is necessary, thereby wasting energy. An existing hot water system lacks the capability and means to determine the periods of time when an external recirculation can be safely turned off without affecting its performance when demands are requested. In contrast, in the present system, the need for external recirculation is identified such that during periods where external recirculation is determined to be unnecessary, the pump adapted to effectuate an external recirculation can be turned off. In order to identify the need for external recirculation, the present system automatically collects data over time, identifies a pattern representing an external recirculation alone and determines the quantity or quantities of flow and/or temperature parameters or pattern/s representing the entry or departure point of external recirculation of the water heating system. Although FIG. 1 shows several points, i.e., A, B, C, D and E where exemplary flowrates are indicated, in practice, typically flowrate is only indicated at one point in the water heating system. Point A represents a point at a point of use. Point B represents a point within the external recirculation circuit. Point C represents a point within a water heater where a flow through it can either be an internal recirculation flow or a flow at point D. Point D represents a point just upstream of a water heater. Point E represents a point in the cold water supply. It is important to note that, in the present system, only one parameter is monitored at one point for the system to identify the pattern indicating external recirculation is the sole activity of the hot water system. In the present system, the monitored parameter is the fluid flowrate entering and exiting the hot water system and this parameter is readily available as a water heating system already includes a flow meter to carry out routine heating actions. The table below lists the exemplary flowrates that are potentially experienced at various points of the diagram shown in FIG. 1. However, in practice, a flow meter is made available only at point C, i.e., a point within the water heater.

Flowrates (expressed in Gallons Per Minute or GPM) at various points of the hot water system shown in FIGS. 1-5 and 7.

|        | A  | B  | C  | D  | E  |
|--------|----|----|----|----|----|
| Case 1 | 0  | 0  | 0  | 0  | 0  |
| Case 2 | 0  | 0  | 10 | 0  | 0  |
| Case 3 | 0  | 10 | 15 | 10 | 0  |
| Case 4 | 5  | 5  | 15 | 10 | 5  |
| Case 5 | 15 | 0  | 15 | 15 | 15 |

Case 1: Water Heaters and External Recirculation Circuit are not Turned on.

Reference shall be made to FIG. 1. This can be a case where the water heating system has just been installed and has not been commissioned or the water heating system has been shut down for repair or service. Notice that the flowrate through each point, i.e., A, B, C, D and E, is zero.

Case 2: Internal Recirculation Only.

Figure 2:
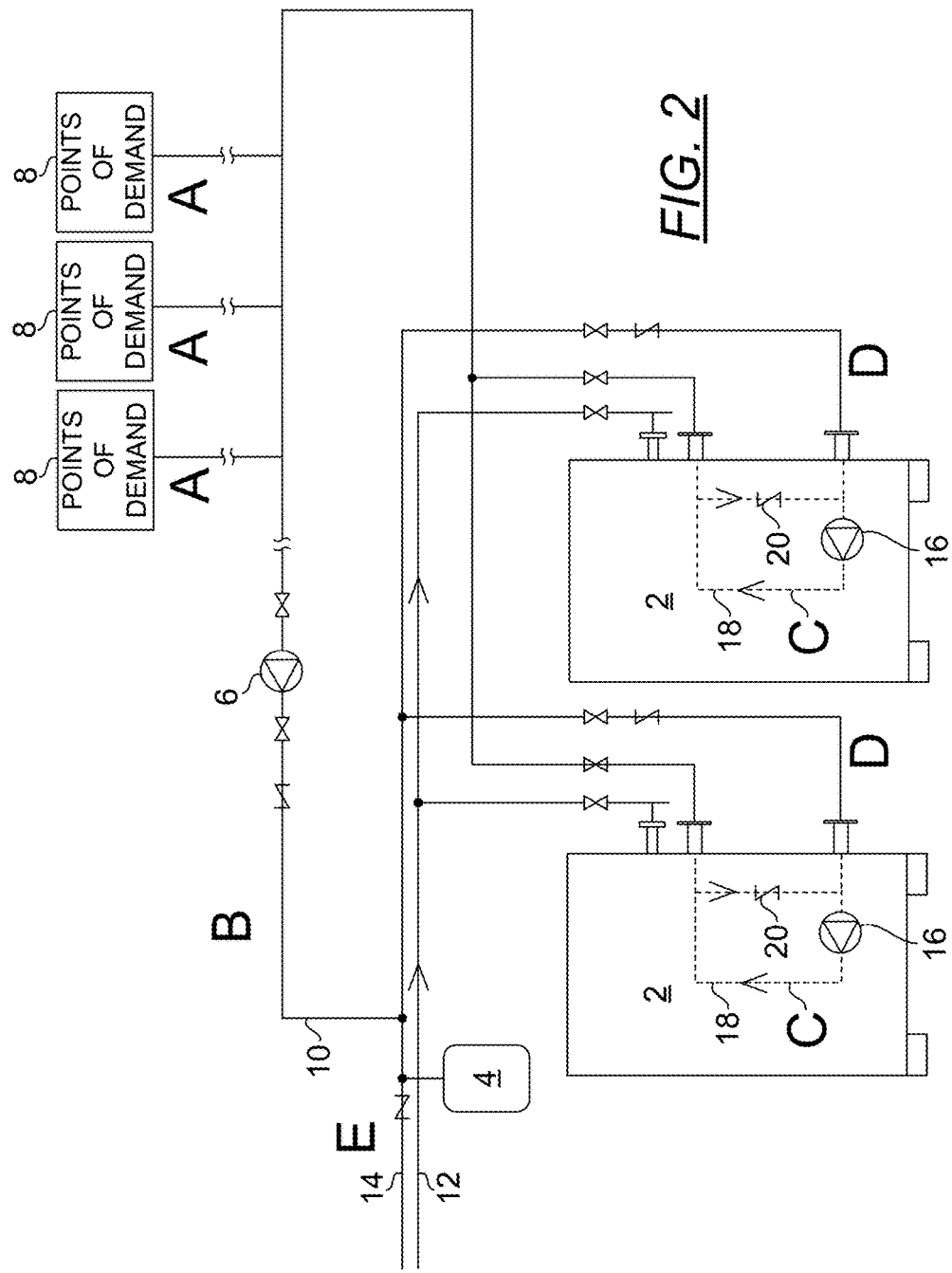
FIG. 2 is a diagram depicting water heaters operably connected to an external recirculation circuit where each water heater includes an internal recirculation circuit that is currently active.

Reference shall be made to FIG. 2. This is a case where no demand is requested. This flow is characterized by a fast rise in temperature as the fluid heated within the internal recirculation circuit is not spent. This is in contrast to heating a fresh, cold water flow that has just entered the cold water supply fluid conductor. Notice that the flowrate through point C is non-zero and there are no flows registered through other points, indicating that internal recirculation circuit is the only active circuit. A water heater can come with or without an internal recirculation circuit. Without an internal recirculation circuit 18, pump 16 and the fluid conductor on which valve 20 is disposed and valve 20 will not be necessary.

Case 3: External Recirculation Only Through Multiple Water Heaters.

Figure 3:
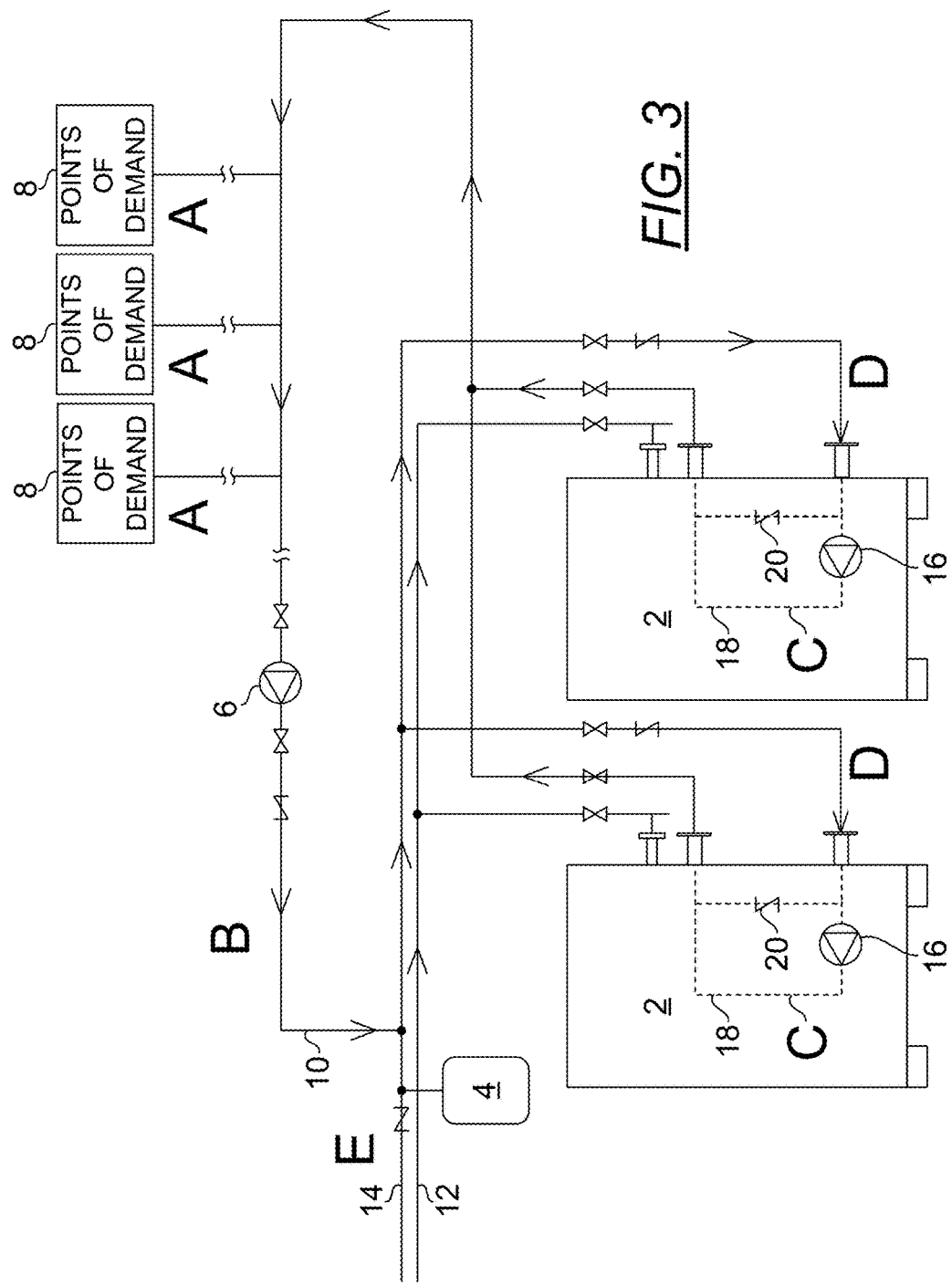
FIG. 3 is a diagram depicting water heaters operably connected to an external recirculation circuit that is currently active without active demands.

Reference shall be made to FIG. 3. This is a case where no demands are requested through at least one point of use 8. External recirculation is effectuated to ensure that the external recirculation path is already at least somewhat warm such that when a demand is requested, hot water can be provided expediently as the target temperature will only need to be heated to a temperature that is only several degrees F. higher than the current temperature. Further, there will not be a long path of cold water contained in the fluid conductor running from a water heater to a point of use that needs to be emptied out before heated water of suitable temperature will commence at a point of use 8. Notice that the flowrate through a point of use 8 is zero, indicating that there is no demand, an external recirculation flow is active as the flowrate through point B is non-zero, an entry flow into at least one water heater is active as the flowrate at point D is non-zero. Typical temperature of return (or spent) water at point C is 70 degrees F. when a demand exists. As the return temperature is substantially the same as or slightly lower than that of the target temperature, it can be confirmed that no demands have been requested.

Case 4: Simultaneous Demand Through Multiple Water Heaters and External Recirculation.

Figure 4:
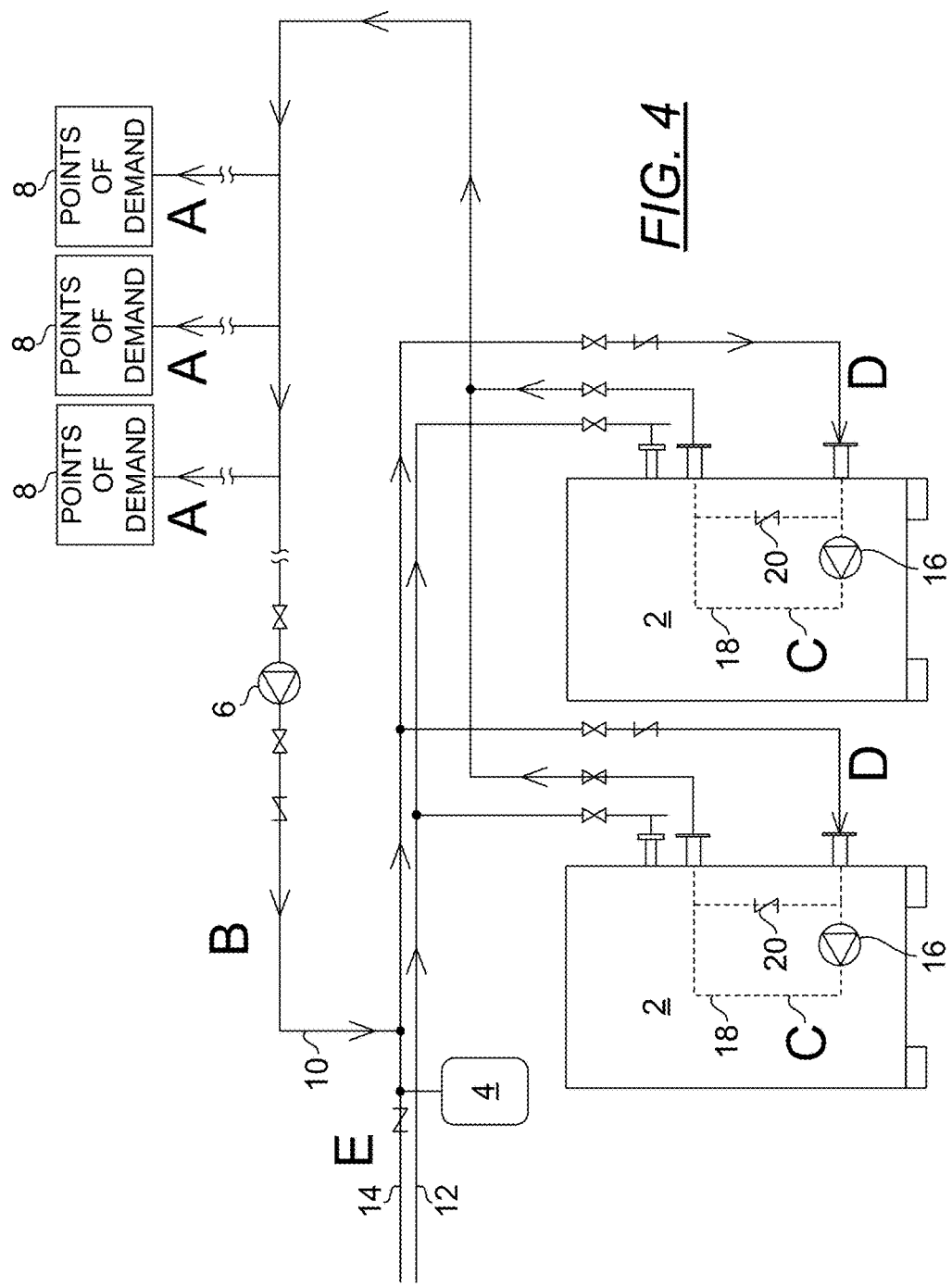
FIG. 4 is a diagram depicting water heaters operably connected to an external recirculation circuit that is currently active with active demands through multiple points of use.

Reference shall be made to FIG. 4. This is a case where demands are requested through at least one point of use. External recirculation is effectuated by pump 6 although a demand already exists. Notice that the flowrate through a point of use is non-zero, indicating that there is a demand, an external recirculation flow is active as the flowrate through point B is non-zero, an entry flow into at least one water heater is active as the flowrate at point D is non-zero. Typical temperature of return (or spent) water at point C is 70 degrees F. when a demand exists.

Case 5: Demand Through Multiple Water Heaters Only.

Figure 5:
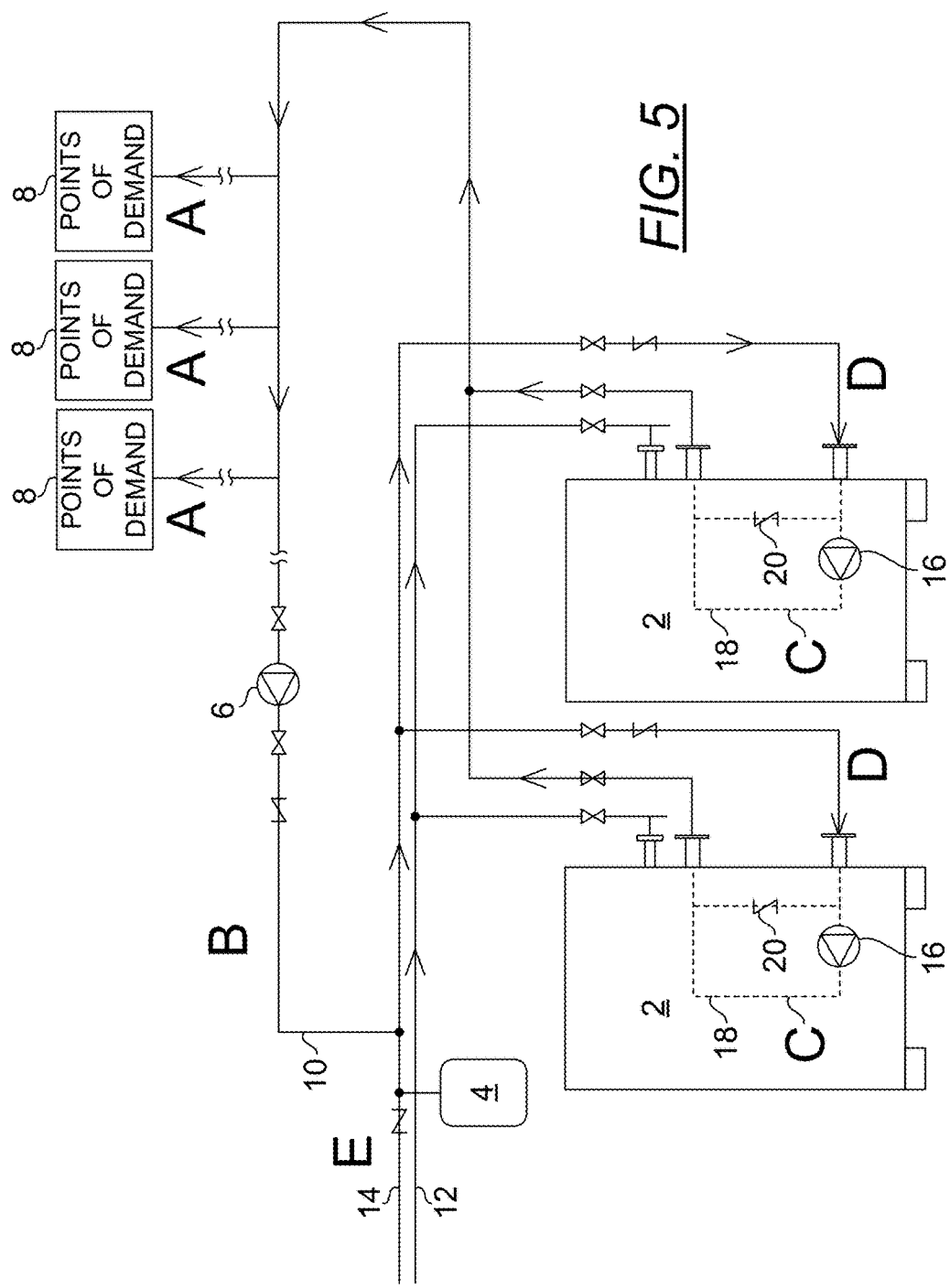
FIG. 5 is a diagram depicting water heaters operably connected to an external recirculation circuit that is inactive due to collectively large active demands through multiple points of use.

Reference shall be made to FIG. 5. This is a case where demands are requested through at least one point of use. Typical temperature of return (or spent) water at point C is 70 degrees F. when a demand exists and when an external recirculation flow is active. This diagram depicts a case where the external recirculation flow cannot occur as a large collective demand is requested through points of use 8. Therefore the return water is simply the cold incoming water supply 14 which has a temperature significantly lower than that of the return water through external recirculation.

It shall be noted, based on the cases disclosed elsewhere herein that if a demand exists, the flowrate detected at point C is higher than the flowrate effectuated only using pump 6. In one embodiment, the contribution in flowrate of pump 6 can be reduced or ceased when a collective demand that receives all of the flow supplied at the water supply 14. The flowrate threshold established by pump 6 differs from one system to another as the pump capacity and variances, e.g., in the flow coefficient in fluid conductors can affect this threshold. In detecting this flowrate threshold of a pump, a historical flowrate is obtained. Minimum non-zero flowrates, which represent external recirculation only, are determined from the historical flowrate. In one embodiment, a minimum non-zero flowrate is obtained not by comparing a single flowrate reading to a minimum flowrate threshold established using the last minimum flowrate. Rather flowrates are averaged over a time span, e.g., of a minute to yield a representative flowrate. This representative or mean flowrate is compared to a minimum flowrate threshold established earlier and if the representative flowrate is lower, it is now set as the new minimum flowrate threshold. A new representative flowrate is obtained for the next minute and this process continues until all historical flowrate data has been exhausted. In one embodiment, as a confirmation that the minimum non-zero flowrate has been located, flowrates are preferably observed to be hovering (e.g., with fluctuations no more than 20% above the mean of the flowrate readings) at about the minimum flowrate over a sustained span of time. In one embodiment, a sustained span of time is at least about 60 minutes. In one embodiment, the minimum flowrate threshold value is computed with at least about 20% over the mean of sustained non-zero minimum flow readings. In other words, in order to be considered sustained non-zero minimum flow readings within a time span, no individual flowrate readings within the time span should lie outside of the 20% band above the mean value. As an example, if the minimum non-zero flowrate is determined to be 1 GPM, the minimum flowrate threshold for determining whether a demand exists will be 1.2 GPM. A demand is said to exist if a minimum non-zero flowrate is greater than 1 GPM. Further, if pump commands have been recorded along with the historical flowrate data, a mapping of the pump speed and/or command with respect to a flowrate can also be established for the present flow circuit as the flowrate seen at a location of a flow circuit is specific to the particular flow circuit. Therefore, with this established pump command-flowrate relationship, a pump can be controlled to yield a certain desired flowrate. Flowrates outside of the minimum non-zero flowrates regime may be considered the results of hot water demands. Further the temperature of the return flow may be used to further confirm whether a demand exists in addition to the increased flowrate from a minimum flowrate experienced at point C. When a demand request starts, the temperature of the flow as detected at around point C is significantly lower than the setpoint temperature of the water heater, i.e., at about 120 degrees F. or the temperature of the flow as detected at point C (upstream of a heat transfer element configured for supplying heat to the flow through C) will drop by a significant amount. This drop may be characterized by an amount of decrease in temperature over a period of three seconds. When a demand request stops, the temperature of the flow as detected at around point C gradually returns to a temperature approximating that of the setpoint temperature of the water heater. Further, the transition from a minimum flowrate to a higher flowrate, without a change in pump command, may indicate a transition from a sole external recirculation to a condition where a demand has been requested. In one embodiment, an external recirculation pump 6 is functionally connected to and controlled by the same controller that controls the internal recirculation pump 16. A transition can also occur where a demand ceases and the only flow that remains is one which is caused by the external recirculation circuit and the flowrate drops to its minimum level. In one embodiment, in the configurations shown in FIGS. 1-5, pump 6 is not used. All external recirculations are caused using only pumps 16 of the water heaters 2.

In yet another embodiment, the pump speed is adjusted down or reduced while external recirculation is determined to be the sole activity of the hot water system. The benefit of lowering the pump speed is two-fold. First, the electricity consumption of the pump is lower. Second, heat losses via the external recirculation circuit are lowered if the hot water flowrate through the circuit is lowered.

In yet another embodiment, the pump speed is adjusted based on the inlet temperature of a water heater, e.g., the temperature detected at point C of the water heater, while external recirculation is determined to be the sole activity of the hot water system. In this case, the setpoint temperature of a water heater is set high, e.g., at 140 degrees F. to anticipate heat losses via the external recirculation circuit. The pump speed can be adjusted such that the temperature detected at point C is about 120 degrees F. If the water temperature at C is higher than 120 degrees F., the pump speed is reduced. If the water temperature at C is lower than 120 degrees F., the pump speed is increased. By controlling the pump speed in this manner, the delay to service a hot water demand can be reduced as the external recirculation circuit is already maintained at a temperature suitable for users, e.g., several degrees F. higher than 120 degrees F.

Figure 6:
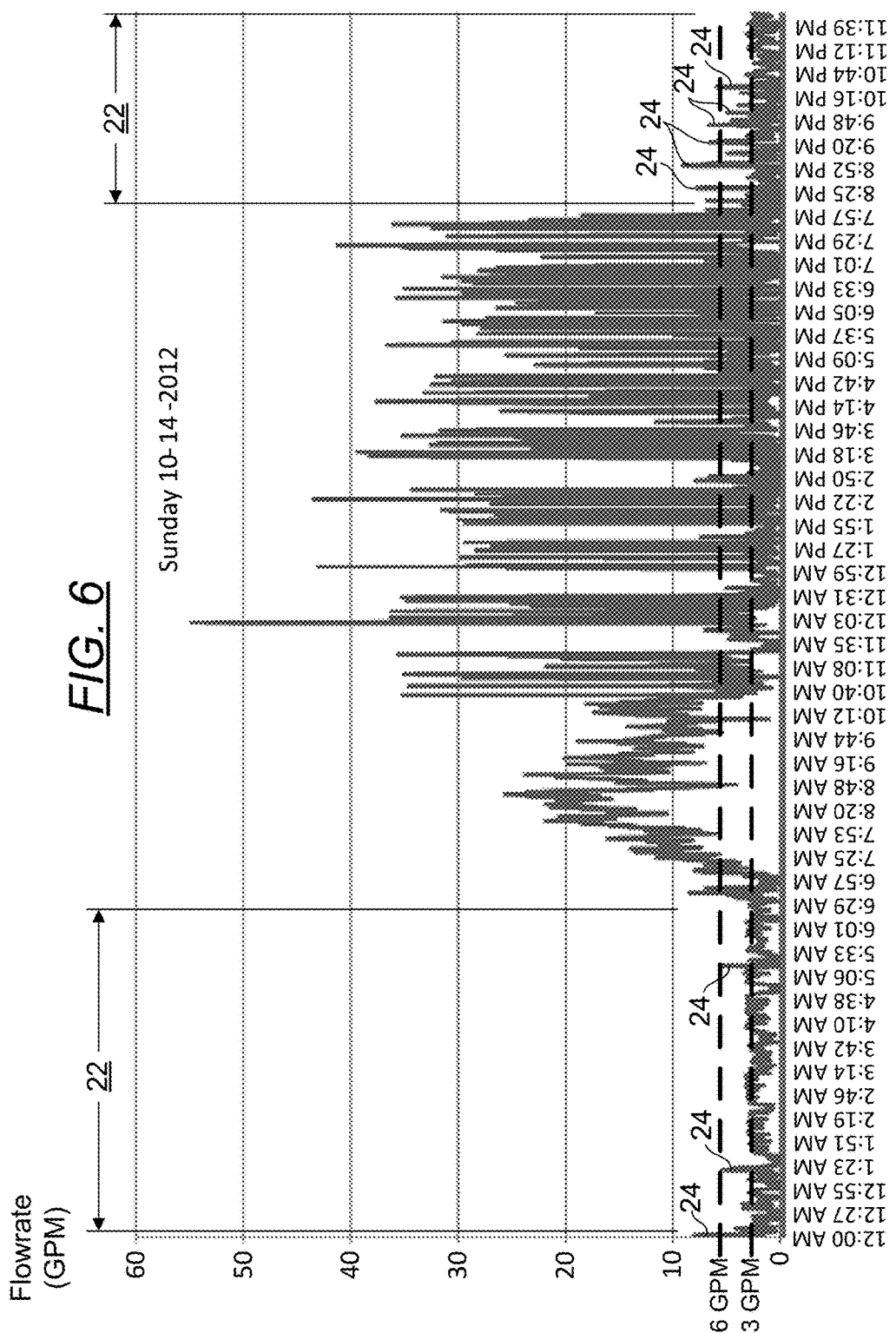
FIG. 6 is a chart depicting a sample of the flowrates measured at point C of a water heater for a time span of twelve hours at a large hot water user location (e.g., hotel).

FIG. 6 is a chart depicting a sample of the flowrates measured at point C of a water heater for a time span of twenty four hours at a large establishment, e.g., hotel with many hot water users. The time spans in which only external recirculation is active are labelled 22 as this is a period where the flowrate is observed to be at its minimum at about 3 GPM. These time spans are determined to be time spans in which an event where only external recirculation is active based on the flowrate readings being minimum and sustained over at least a long period of time, i.e., from about 12 AM to about 6:29 AM and again from about 8:25 PM to about 11:39 PM, i.e., over 30 minutes). It shall be noted that, with the exception of several flowrate spikes 24 over these long periods of time, i.e., over 60 minutes each, the minimum non-zero flowrate has been rather steady. In one embodiment, flowrate spikes are not factored into the consideration or determination of a minimum non-zero flowrate as such spikes typically last momentarily and responding to such spikes will be counterproductive as the spikes are short-lived or sparing demands or usage. In one embodiment, an increase in demand is considered short-lived if the increase lasts under 10 seconds. Unless, in the highly unlikely event that hot water demands are constantly requested during the 12-hour span, the minimum flow at 3 GPM can be considered a result of external recirculation. In one embodiment, without considering the flowrate spikes, when the flowrate is twice as large as the minimum flow, pump 6 is turned off as the total demand is considered sufficiently large to already effectuate external recirculation. When the flowrate drops below 1.5 times the minimum flow, pump 6 is turned back on to cause external recirculation again. In another embodiment, a threshold of 20%, such as one disclosed elsewhere herein is used instead when more stringent delivery of hot water already at setpoint temperature is desired.

Figure 7:
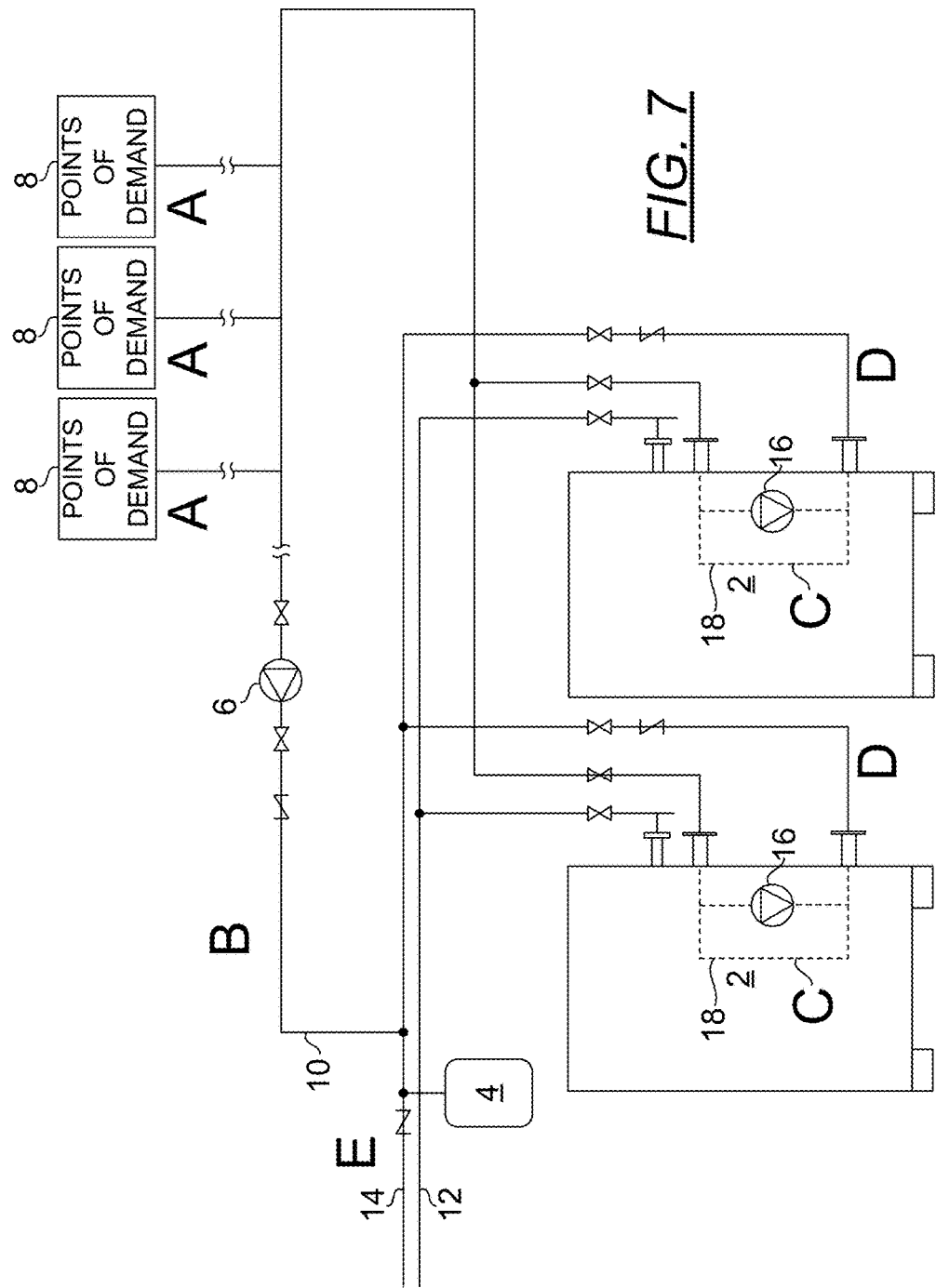
FIG. 7 is a diagram depicting water heaters operably connected to an external recirculation circuit where each internal recirculation pump is connected in a different configuration than the internal recirculation pump shown in FIGS. 1-5.

FIG. 7 is a diagram depicting water heaters operably connected to an external recirculation circuit where each internal recirculation pump 16 is connected in a configuration different than the internal recirculation pump 16 shown in FIGS. 1-5. It shall be noted that, in addition to the ability to cause internal recirculation, the internal recirculation pump 16 of FIGS. 1-5 can also cause external recirculation if necessary when valve 20, which is disposed in the internal recirculation loop, is partially or completely closed while the pump 16 configuration of FIG. 7 is not capable of also causing external recirculation.

Referring to FIG. 7, a sustained minimum non-zero flow reading corresponds to the flowrate caused when pump 6 is turned on. For configurations having pumps 16 that can also cause external recirculation, e.g., those shown in FIGS. 1-5, a sustained minimum non-zero flow reading may also corresponds to the flowrate caused when pump 6 and pumps 16 are turned on. The act of lowering the temperature setpoint (by an amount) of a water heater is called setting back the temperature setpoint by the amount. The present system may be programmed to progressively provide a setback. For example, a first amount of setback of, e.g., 5 degrees F., can be effectuated for the first week upon detecting the pattern indicating that the setpoint temperature can be adjusted to conserve energy. If this pattern persists in the first week, the setback can be set even larger in the second week, e.g., 10 degrees, if again, no demands are requested during the period in which the setpoint temperature is set back in the first week. This adjustment continues until the setpoint temperature is deemed too low for providing suitable hot water when a demand is requested.

In one embodiment, each time span of a day used is at least about 60 minutes. In other words, in order for a flowrate pattern to be considered significant in the day, the duration within which this flowrate pattern occurs has to be at least about 60 minutes. The use of such a time span of a day removes fluctuations due to factors unrelated to an external recirculation.

In one embodiment, the time period is about one week. By having observed the flowrate at point C of a water heater for a week, the hot water consumption pattern can be established for both weekend days and weekdays.

In one embodiment, each overlap used is at least about 30 minutes out of the time span of a day where a flowrate pattern indicating external recirculation only that lasts for at least about 60 minutes in duration has been previously identified. For instance, if the duration 12 AM-4 AM Monday of one week has been identified as a time span where no demand exists and 12:30 AM-5:30 PM Tuesday of the same week has also been identified as a time span where no demand exists, the overlap would be from 12:30 AM-4 AM, which is greater than 30 minutes. In one embodiment, the frequency threshold is about three. In other words, if applied to the same example here, another overlap of at least 30 minutes from another day (for a total of three) within the same week will confirm the overlapped time span of a specific flowrate pattern where subsequent one or more actions will be taken to react to this flowrate pattern. By only reacting to a pattern established within a substantial time span, excessive changes in the setpoint temperature can be avoided, removing the potential that the hot water system is firing excessively in attempting to meet the setpoint temperature or the pump being turned on and off repeated within a short period of time which not only will not result in significant energy savings but will cause excessive wear and tear in the pump.

As a summary, disclosed herein is a method for controlling external recirculation in a hot water system having a main heating circuit, an external recirculation circuit fluidly and operably connected to the main heating circuit, a flow meter configured for detecting a flowrate through the main heating circuit, a pump for effectuating circulation in the external recirculation circuit, a controller operably connected to the flow meter and the pump. The method including:

(a) determining at least one event from flowrate data of the flow meter collected over a time period of a plurality of days, e.g., 7 days or a week. The event includes a time span of a day in which the flowrate remains below or at a threshold value over the time span of a day within each day of the plurality of days;

(b) determining overlaps of each event to another one of the events of all days within the time period. It is possible that there can be multiple time spans within a day where flowrate remains below or at the threshold value. Therefore the number of events can be greater than one in a day; and (c) determining a frequency of the overlaps of each event over the time period and if the frequency exceeds a frequency threshold, executing a counteraction pair including a first action and a second action in opposition to the first action during a time span corresponding to each event, wherein the first action is executed at the start of the time span corresponding to each event and the second action is executed at the end of the time span corresponding to each event within a new time period.

In one embodiment, the counteraction pair includes lowering the temperature setpoint of the hot water system and raising the temperature setpoint of the hot water system.

In another embodiment, the counteraction pair includes lowering the speed of the pump to a value lower than its normal speed and raising the speed of the pump to its normal speed.

In one embodiment, the counteraction pair includes turning off the pump and turning on the pump.

In one embodiment, the counteraction pair includes lowering the temperature setpoint of the hot water system and raising the temperature setpoint of the hot water system.

In one embodiment, time spans of a day, outside of the event are determined and the pump is turned off during these time spans as demand for hot water is already sufficiently large that the external recirculation circuit has already been filled with sufficient hot water provided that the desired hot water delivery pressure can be met without the use of the pump.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for controlling external recirculation in a hot water system having a main heating circuit, an external recirculation circuit fluidly and operably connected to the main heating circuit, a flow meter configured for detecting a flowrate through the main heating circuit, a pump for effectuating circulation in the external recirculation circuit, a controller operably connected to the flow meter and the pump, said method comprising using the controller for:
   (a) determining at least one event from flowrate data of the flow meter over a time period of a plurality of days, said event comprising a time span of a day in which the flowrate remains below or at a threshold value over said time span of a day within each day of said plurality of days;
   (b) determining overlaps of said each event to another one of said each event of all days within said time period; and
   (c) determining a frequency of the overlaps of said each event over said time period and if the frequency exceeds a frequency threshold, executing a counteraction pair including a first action and a second action in opposition to the first action during a time span corresponding to said each event, wherein said first action is executed at the start of said time span corresponding to said each event and said second action is executed at the end of said time span corresponding to said each event within a new time period.

2. The method of claim 1, wherein said counteraction pair comprises lowering the temperature setpoint of the hot water system and raising the temperature setpoint of the hot water system.

3. The method of claim 1, wherein said counteraction pair comprises lowering the speed of the pump to a value lower than its normal speed and raising the speed of the pump to its normal speed.

4. The method of claim 1, wherein said counteraction pair comprises turning off the pump and turning on the pump.

5. The method of claim 1, wherein said threshold value is a mean of sustained non-zero flowrate.

6. The method of claim 1, wherein said threshold value is about 20% over a mean of minimum sustained non-zero flowrate.

7. The method of claim 1, wherein said time period is about a week.

8. The method of claim 1, wherein said time span of a day is about 60 minutes.

9. The method of claim 8, wherein said overlap is about 30 minutes.

10. The method of claim 1, wherein said frequency threshold is about three.

11. A method for controlling external recirculation in a hot water system having a main heating circuit, an external recirculation circuit fluidly and operably connected to the main heating circuit, a flow meter configured for detecting a flowrate through the main heating circuit, a pump for effectuating circulation in the external recirculation circuit, a controller operably connected to the flow meter and the pump, said method comprising using the controller for:
   (a) determining at least one event from flowrate data of the flow meter over a time period of a plurality of days, said event comprising a time span of a day in which the flowrate is greater than a threshold value over said time span of a day within each day of said plurality of days;
   (b) determining overlaps of said each event to another one of said each event of all days within said time period; and
   (c) determining a frequency of the overlaps of said each event over the time period and if the frequency exceeds a frequency threshold, executing a counteraction pair including a first action and a second action in opposition to the first action during a time span corresponding to said each event, wherein said first action is executed at the start of said time span corresponding to said each event and said second action is executed at the end of said time span corresponding to said each event within a new time period.

12. The method of claim 11, wherein said counteraction pair comprises turning off the pump and turning on the pump.

13. The method of claim 11, wherein said threshold value is a mean of sustained non-zero flowrate.

14. The method of claim 11, wherein said threshold value is about 20% over a mean of minimum sustained non-zero flowrate.

15. The method of claim 11, wherein said time period is about a week.

16. The method of claim 11, wherein said time span of a day is about 60 minutes.

17. The method of claim 16, wherein said overlap is about 30 minutes.

18. The method of claim 11, wherein said frequency threshold is about three.

* * * * *